(12) United States Patent
Saliahov

(10) Patent No.: US 7,039,188 B2
(45) Date of Patent: May 2, 2006

(54) OPTICAL DISC AUTHENTICATION METHOD AND APPARATUS

(76) Inventor: Oleg Saliahov, 60 Sirenevil Boulevard, Apartment 03, Moscow (RU)

( * ) Notice: Subject to any disclaimer, the term of this patent is extended or adjusted under 35 U.S.C. 154(b) by 836 days.

(21) Appl. No.: 09/943,876

(22) Filed: Aug. 31, 2001

(65) Prior Publication Data

US 2003/0072447 A1    Apr. 17, 2003

(51) Int. Cl.
*H04N 7/167* (2006.01)
(52) U.S. Cl. .................................................. 380/229
(58) Field of Classification Search ................ 380/229
See application file for complete search history.

(56) References Cited

U.S. PATENT DOCUMENTS

| | | | |
|---|---|---|---|
| 4,577,289 A | 3/1986 | Comerford et al. ......... 364/900 |
| 4,785,361 A * | 11/1988 | Brotby ........................ 360/60 |
| 4,823,333 A | 4/1989 | Satoh et al. .................. 369/84 |
| 5,696,757 A | 12/1997 | Ozaki et al. ............. 369/275.4 |
| 5,703,858 A | 12/1997 | Mitchell et al. ............... 369/58 |
| 5,703,859 A | 12/1997 | Tahara et al. .................. 369/84 |
| 5,745,569 A | 4/1998 | Moskowitz et al. ........... 380/4 |
| 5,812,501 A | 9/1998 | Moribe et al. |
| 5,812,663 A | 9/1998 | Akiyama et al. ............... 380/4 |
| 5,881,038 A | 3/1999 | Oshima et al. ............... 369/59 |
| 6,076,165 A | 6/2000 | Maenza ....................... 713/200 |
| 6,535,469 B1 | 3/2003 | Heylen |
| 6,560,176 B1 * | 5/2003 | Heylen ....................... 369/53.1 |

FOREIGN PATENT DOCUMENTS

| | | |
|---|---|---|
| SG | 0 644 474 A1 | 3/1995 |
| WO | WO 95/35533 | 12/1995 |
| WO | WO 99/35641 | 7/1999 |

OTHER PUBLICATIONS

McLallo; "CD-COPS Another Ready-Made Protection Annihilated"; Internet Interview; Jan. 20, 1999: http://fravia.frame4.com/cdromcla.htm.

Serge Pachkovsky; (No title); Translation of an article from the original Russian; Novosibirsk, Siberla; Jun. 6, 1991.

* cited by examiner

*Primary Examiner*—Gregory Morse
*Assistant Examiner*—Jacob Lipman
(74) *Attorney, Agent, or Firm*—Gardner Groff, P.C.

(57) ABSTRACT

The present invention relates to an optical disc authentication method and apparatus. The method, wherein each disc has a plurality of ways and a plurality of sectors in each way, includes the steps of measuring the quantity of sectors in each of a defined quantity of ways to provide a disc fingerprint comprising way sector quantity values for an original disc and a target disc and authenticating the target disc. The step of authenticating the target disc includes the steps of comparing the target disc fingerprint to the original disc fingerprint to determine a percentage of coinciding way sector quantity values and classifying the target disc according to whether its determined percentage value is above or below a pre-defined percentage threshold value, wherein a target disc having a determined percentage value of greater than or equal to the threshold value is classified as an original disc, and a target disc having a determined percentage value of less than the threshold value is classified as an illegally copied disc.

48 Claims, 8 Drawing Sheets

OPTICAL DISC AUTHENTICATION METHOD AND APPARATUS

CROSS-REFERENCE TO RELATED APPLICATIONS

This application claims priority to Canadian Patent Application Serial No. 2,318,310, filed Sep. 1, 2000 entitled "CD-Disk Identification Through a Pattern Analysis."

1. Field of the Invention

The present invention relates to digital storage devices, and more particularly to optical disc authentication.

2. Background of the Invention

The popularity of the optical storage disc has risen dramatically since its introduction in the early 1980's. Optical discs, typically referred to as "CDs" (compact disc), "CD-ROMs" (compact disc read-only memory) and more recently "DVDs" (digital versatile disc), have increasingly enjoyed wide acceptance within several industries. Manufacturers have been quick to adopt the format, regularly employing optical discs in the distribution of products such as music and computer software due to their ability to provide virtually error-free duplication.

However, in large part because of these very advantages, companies are increasingly faced with the illegal copying and distribution of copyrighted material. The problem has only been exacerbated by an enormous increase in the accessibility of duplicating equipment due to recent technical advances that have lowered their cost.

In an effort to discourage illegal copying, methods have been attempted to differentiate an original disc from an illegally copied one. The most common technique for optical disc authentication has been to write distinguishing marks on the disc along with the product data. These distinguishing marks are made to be difficult to correctly copy onto a disc, or include information relating to a physical location on the disc.

Another technique is to embed an identifier in the appended parity bytes that are used for detecting and correcting errors in data frames. Still another technique provides a unique serial number that software can verify with a password contained within the product data.

However, these methods have typically required laborious additional steps within the mastering process, and lack a format-insensitive solution.

For the foregoing reasons, there is a need for an improved method of optical disc authentication.

SUMMARY OF THE INVENTION

The present invention is directed to an optical disc authentication method and apparatus. The method, wherein each disc has a plurality of ways and a plurality of sectors in each way, includes the steps of measuring the quantity of sectors in each of a defined quantity of ways to provide a disc fingerprint comprising way sector quantity values for an original disc and a target disc and authenticating the target disc.

The step of authenticating the target disc includes the steps of comparing the target disc fingerprint to the original disc fingerprint to determine a percentage of coinciding way sector quantity values and classifying the target disc according to whether its determined percentage value is above or below a pre-defined percentage threshold value, wherein a target disc having a determined percentage value of greater than or equal to the threshold value is classified as an original disc, and a target disc having a determined percentage value of less than the threshold value is classified as an illegally copied disc.

In an aspect of the present invention, the measuring step includes the steps of determining optical disc drive characteristics, collecting sector reading time data and processing the collected data to provide way sector quantity values.

In an aspect of the present invention, the optical disc drive characteristics are determined by determining cache buffer memory size of the disc drive and determining reading speed reduction parameters of the disc drive.

In an aspect of the present invention, the sector reading time data is collected by filling the cache buffer with blank data and collecting reading time data in a reading time array from a defined quantity and location of ways on a disc.

In an aspect of the present invention, the collected data is processed by filtering the data to compensate for reading errors, determining a common slope from the filtered data and identifying slopes matching the determined common slope to ascertain individual ways for the measurement of way sector quantity values.

Other aspects and features of the present invention will become apparent to these ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PRESENTLY PREFERRED EMBODIMENT

Figure 1A:
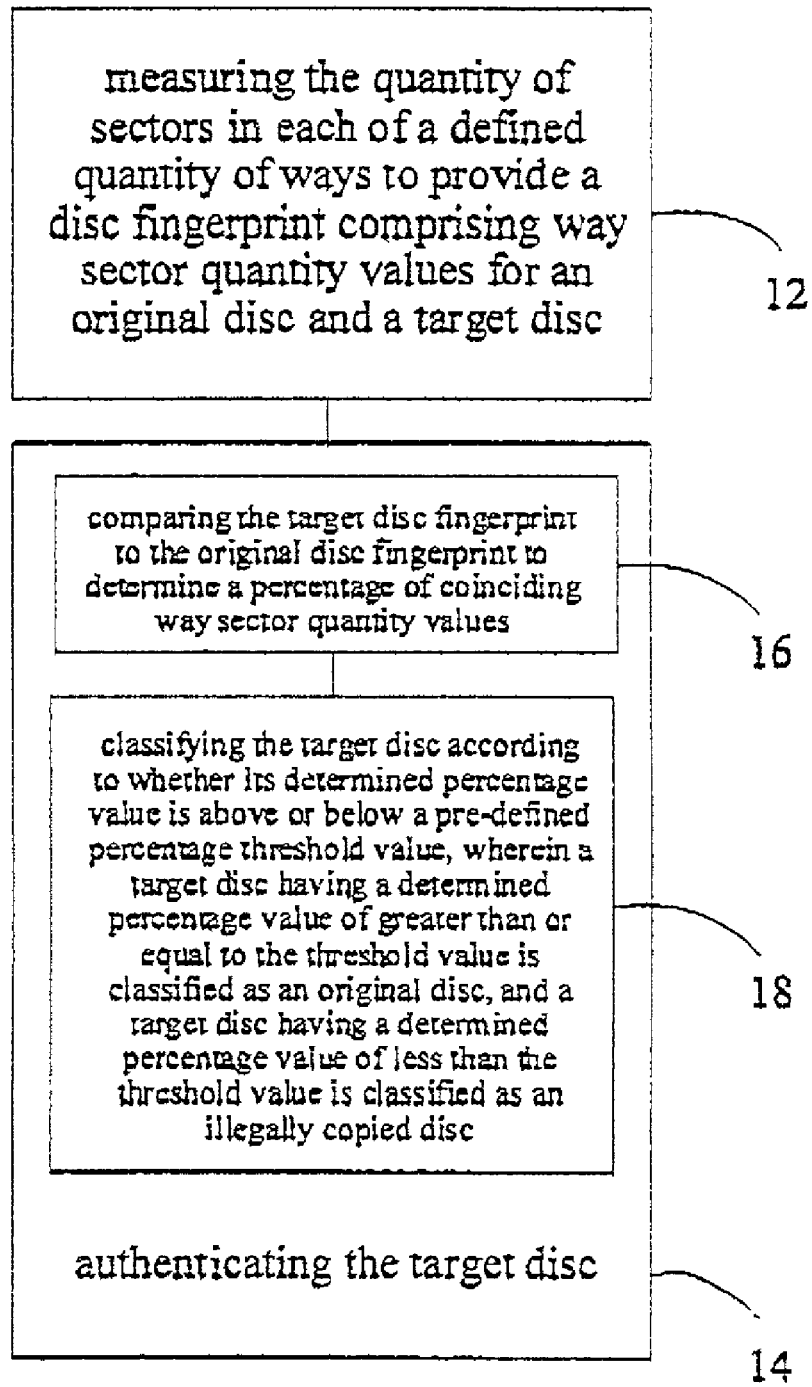
FIG. 1a is an overview of an optical disc authentication method according to the present invention.

The present invention is directed to an optical disc authentication method and apparatus. As shown in FIG. 1a, the method, wherein each disc has a plurality of ways and a plurality of sectors in each way, includes the steps of measuring the quantity of sectors in each of a defined quantity of ways to provide a disc fingerprint comprising way sector quantity values for an original disc and a target disc 12 and authenticating the target disc 14.

The step of authenticating the target disc 14 includes the steps of comparing the target disc fingerprint to the original disc fingerprint to determine a percentage of coinciding way sector quantity values 16 and classifying the target disc according to whether its determined percentage value is above or below a pre-defined percentage threshold value, wherein a target disc having a determined percentage value of greater than or equal to the threshold value is classified as an original disc, and a target disc having a determined percentage value of less than the threshold value is classified as an illegally copied disc 18.

Figure 1B:
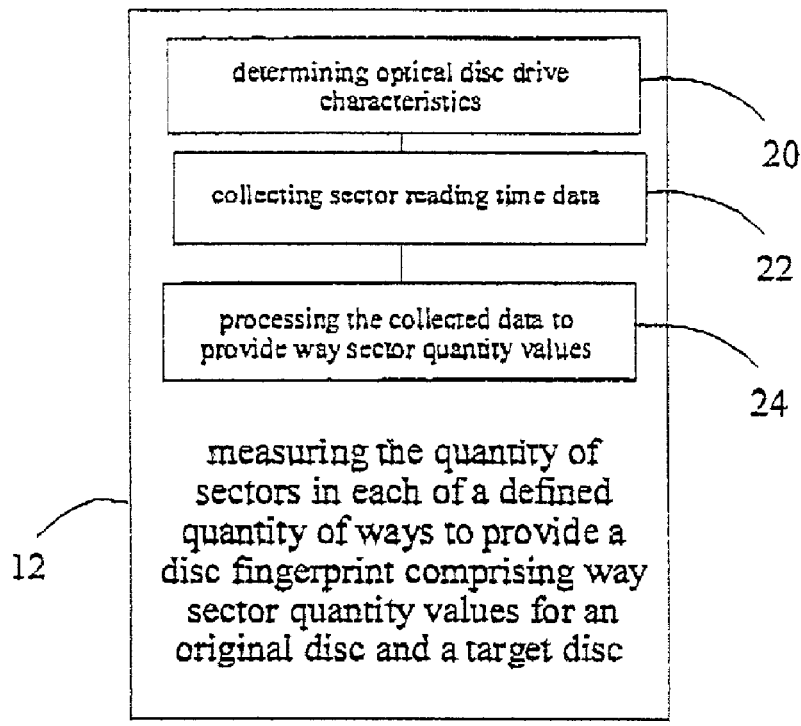
FIGS. 1b–1e show embodiments of the optical disc authentication method according to the present invention.

As shown in FIG. 1*b*, in an embodiment of the present invention, the measuring step 12 includes the steps of determining optical disc drive characteristics 20, collecting sector reading time data 22 and processing the collected data to provide way sector quantity values 24.

Figure 1C:
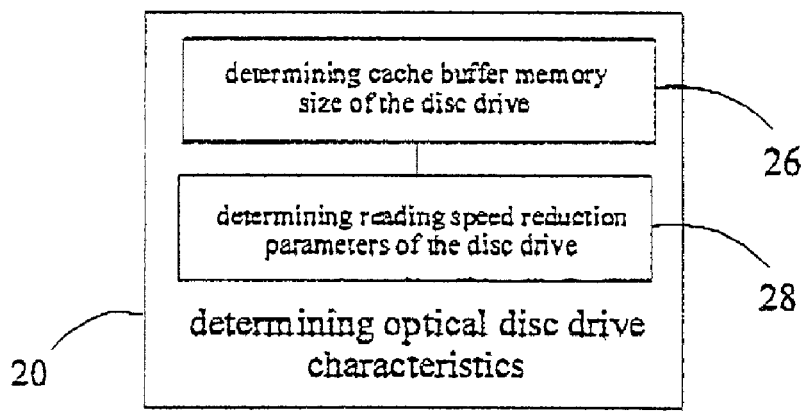

As shown in FIG. 1*c*, in an embodiment of the present invention, the optical disc drive characteristics are determined by determining cache buffer memory size of the disc drive 26 and determining reading speed reduction parameters of the disc drive 28.

Figure 1D:
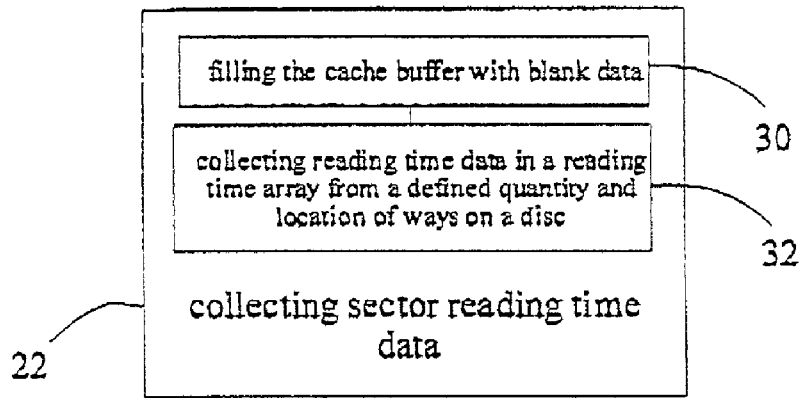

As shown in FIG. 1*d*, in an embodiment of the present invention, the sector reading time data is collected by filling the cache buffer with blank data 30 and collecting reading time data in a reading time array from a defined quantity and location of ways on a disc 32.

Figure 1E:
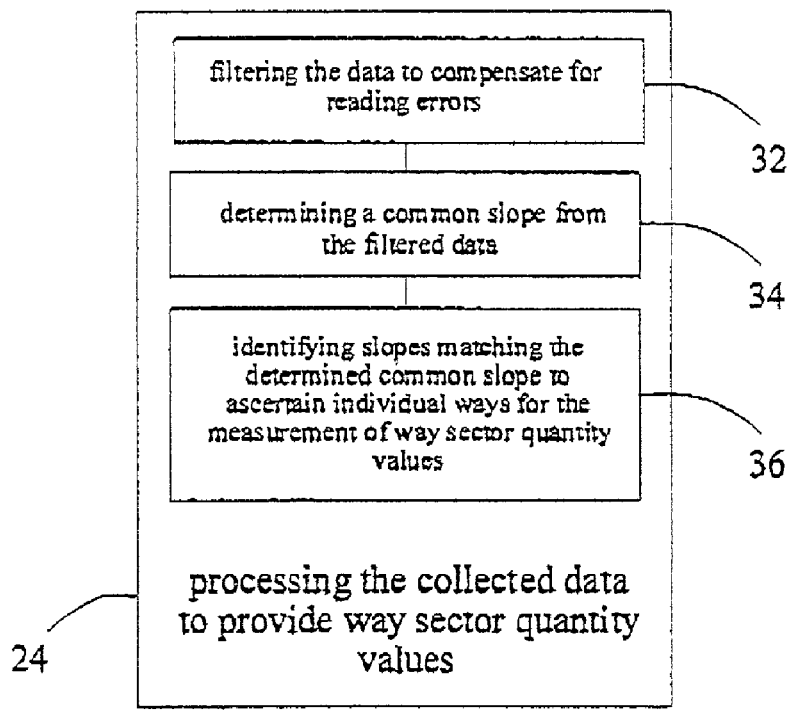
Figure 2A:
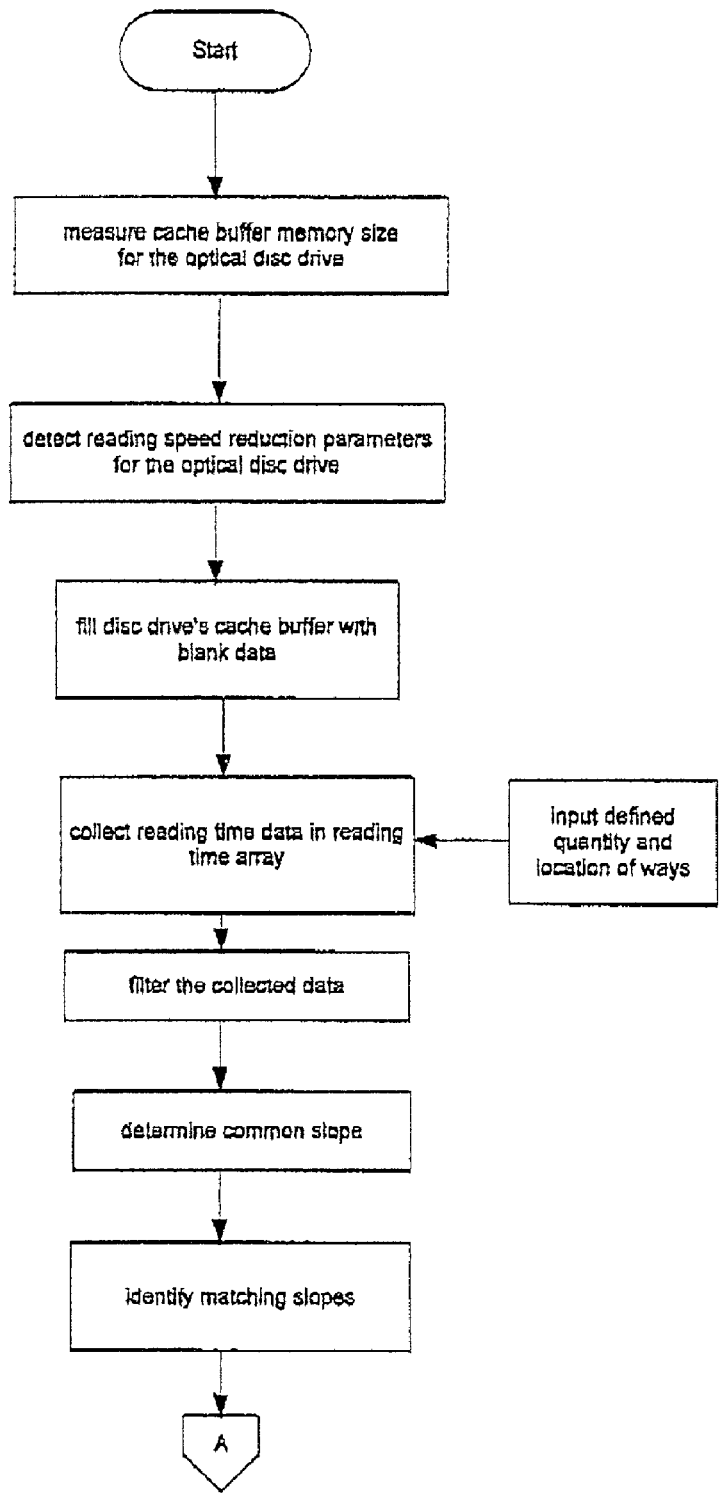
FIGS. 2a and 2b show a flowchart of an optical disc authentication method according to the present invention.
Figure 2B:
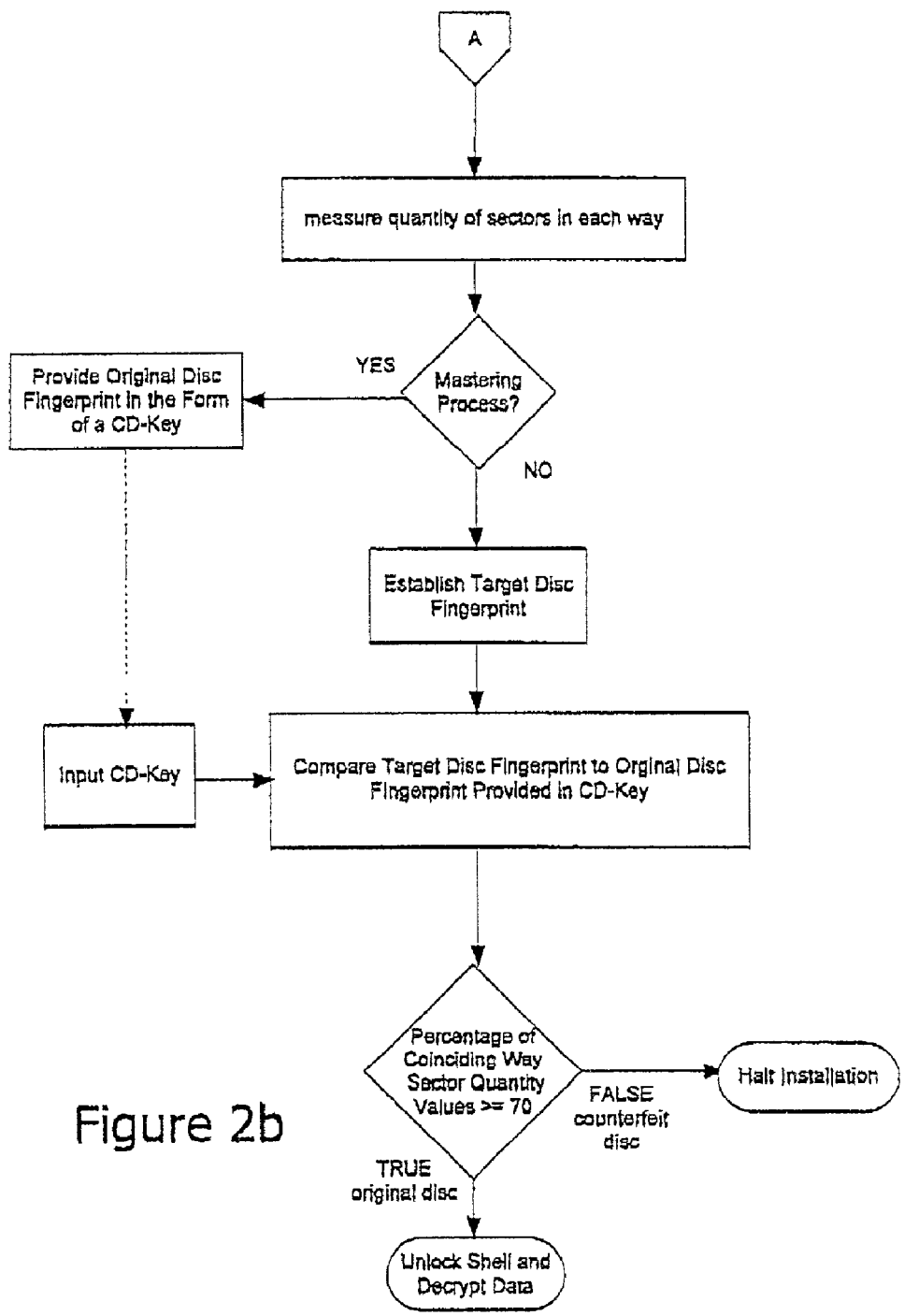

As shown in FIG. 1*e*, in an embodiment of the present invention, the collected data is processed by filtering the data to compensate for reading errors 34, determining a common slope from the filtered data 36 and identifying slopes matching the determined common slope to ascertain individual ways for the measurement of way sector quantity values 38.

Data is recorded on an optical disc in a process called "mastering". The first sage in the mastering process involves the recording of product data onto an original disc known in the industry as a "gold master". The data is recorded on the disc in the form of a spiral path called a "trace" that starts from the inside edge of the disc and winds its way towards the outer edge and is made up of sectors containing "pits" representing "1s" and "hills" representing "0s".

A specialized decoding machine copies the data from the gold master to a "master" disc, The master disc is then electrochemically plated with a thick layer of metal that, when separated from the master, provides a negative of the master known as a "stamper". Stampers are then used for disc duplication.

Disc duplicates have geometric structures that are virtually identical to the geometric structures of their respective masters. However, duplicates created from different masters differ due to sector writing deviations on the masters. These deviations are created by factors such as noise, loss of accuracy in laser placement control or change in disc rotation speed directly affecting the division of data into sectors.

These deviations take the form of a physical displacement of the pits and hills along the length of the trace resulting in a deviation in the physical length of the sector, so that even two master discs with identical binary information and produced on the same machine from the same gold master are different. This displacement can be especially pronounced in certain portions of the master disc, particularly at its outer edge due to error accumulation.

Therefore, since a direct relationship exists between a sector's reading time and its physical length, the invention collects reading time data to measure differences in sector lengths.

In an embodiment of the present invention, cache buffer memory size is determined from a cache size algorithm 42, shown in Table 1. The cache size algorithm 42 measures cache buffer memory size in relative single sector units. Cache buffer memory is contained in a memory chip installed on the logic board and serves as a storage area for data ready to be sent to the computer's microprocessor.

TABLE 1

```
CACHE_SIZE=100;
ReadSector(0,1,NULL);
Read Sector(0,1,&time);
cachetime=time;
for(i=CACHE_SIZE;i>0;i=2)
{
    ReadSector(0,i,NULL);
    ReadSector(0,1,&time);
    if (time<2*cachetime)break;
}
//Total cache size
cachesize=i;
```

Since the buffer would alter the reading time results if reading time data were allowed to run through it, while reading the cache buffer memory is filled with blank data to allow reading time data to bypass it to provide a direct "flow-through" of information enabling reading time measurement in real time.

As well, since higher speeds tend to result in more errors, drives employ reading speed reduction to help reduce reading errors. Since parameters differ between drives, to compensate for altered results that may occur due to differing drive parameters, a reading speed reduction parameter algorithm is employed in the reading speed reduction parameters determination step 26 to determine the drive's reading speed reduction parameters.

Figure 3:
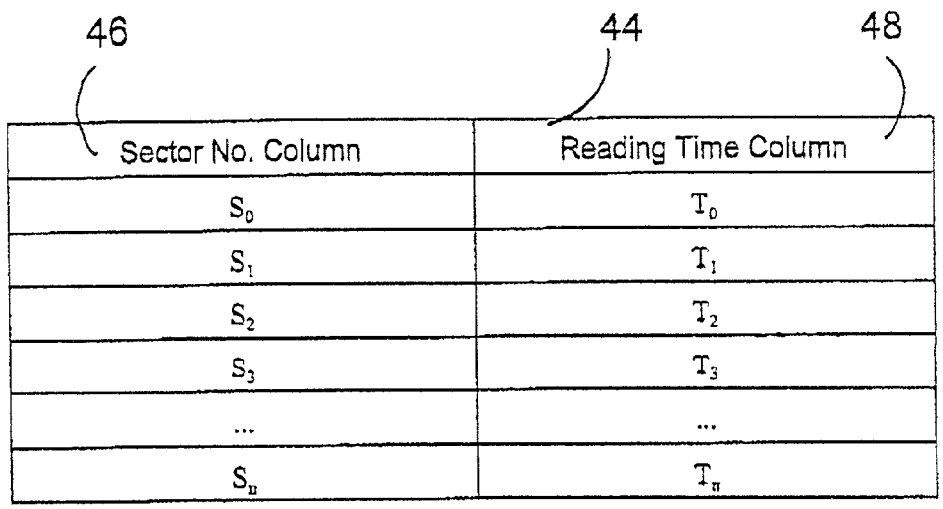
FIG. 3 shows a reading time array.

In the data collection step 20 a "reading time algorithm" is employed for populating a "reading time array" 44, shown in FIG. 3, with sector reading time data. The reading time array includes a sector number column 46 and a reading time column 48.

Since authentication accuracy is directly proportional to the quantity of sectors tested, the more sectors that are tested the more accurate the result. In compromising between speed and accuracy, it has been found through experimentation that an appropriate quantity of test sectors is at least about 1000, translating into roughly 50 turns or "ways", a way being defined as one complete turn of the trace.

Figure 4:
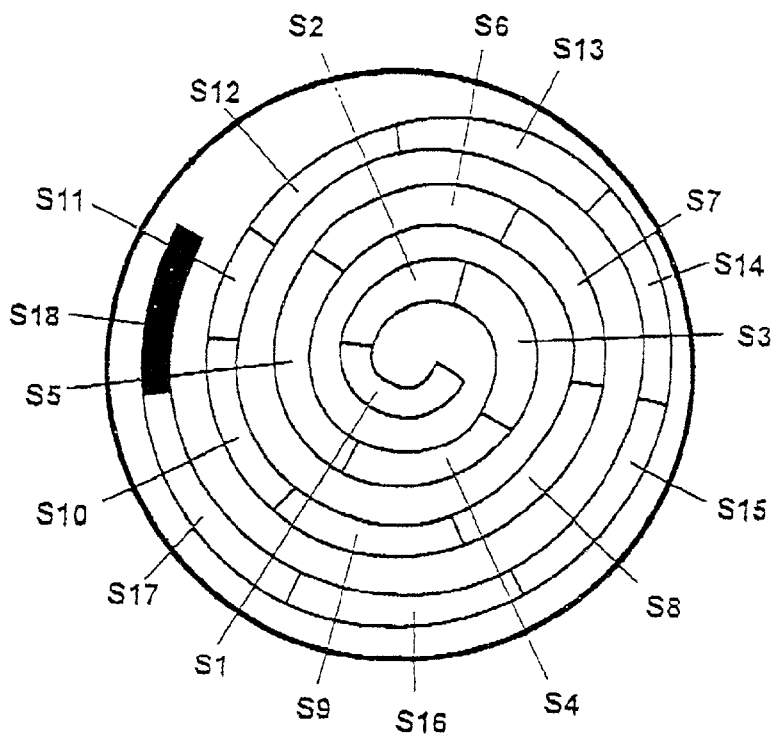
FIG. 4 is a representation of a top view of an optical disc showing a sector reading sequence.

In the data collection step 20, a "base sector" is designated and reading time measurements are taken from the base sector to each subsequent test sector in sequence towards the disc center. Reading time is defined as the sum of two time elements; the time it takes for the head to move from the base sector to a sequential sector and the time it takes to read the sequential sector. For example, as shown in FIG. 4, a disc having a base sector designated as Sector 18 or S18 would have a reading sequence of S18,S17; S18,S16; S18,S15 . . . S18,S01.

Figure 5:
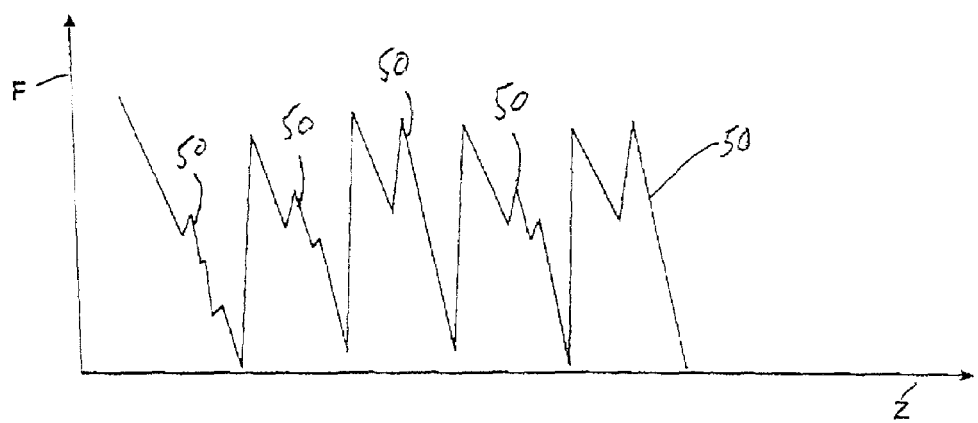
FIG. 5 is a graph of raw sector reading time data.

As shown in FIG. 5, the graphed raw data from the reading time array appears as a zigzagged line, the F-axis representing reading times and the Z axis representing sector numbers. The line contains erratic peak-anomalies or "leaps" 50 that appear an the right-hand slopes of the line reflecting sector-reading errors caused by factors such as disc damage.

Figure 6:
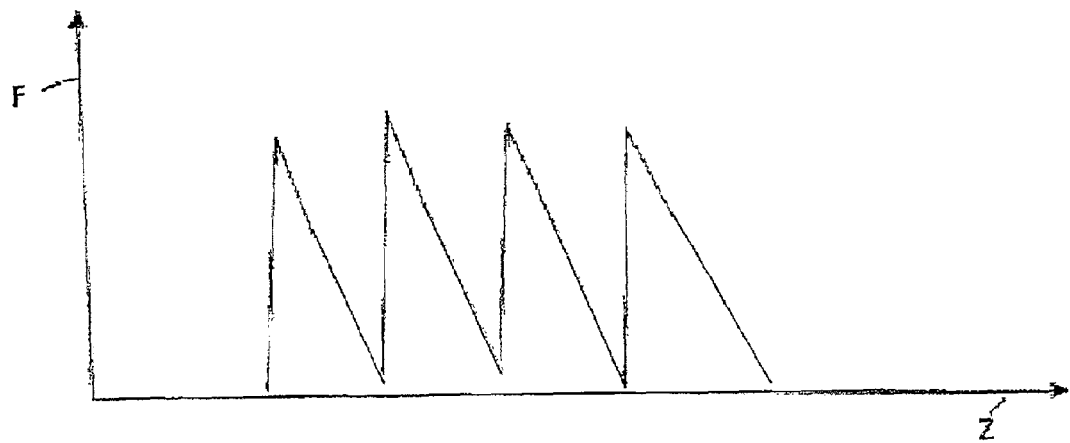
FIG. 6 is a graph of filtered sector reading time data.

To improve accuracy, the data is filtered to compensate for these factors using a filtering algorithm 52 shown in Table 2. The algorithm removes anomalies between the upper and lower ends of the right hand slopes of the line so that it no longer containing leaps as shown in FIG. 6.

TABLE 2

```
Y_{i-1}<Y_i>Y_{i+i}; where Y_{i-1}>Y_{i+1}
for(i=1;i<SEEK_SECTOR-1;i++)
{
if(time[i-1]<time[i]&&time[i+1]<time[i-1])time[i]=(time[i-
    ]+time[i+2])/2;
}
where:
i is used for tracking the data
Yi represents the raw data
```

Once the data has been filtered, individual ways are discerned by determining a common slope for the majority of peaks employing a common slope algorithm 54 shown in Table 3.

TABLE 3

```
double k=0;
    int count=0;
    for(i=0;i<SEEK_SECTOR-1;i++)
    {
        if(time[i+1]<time[i])
    {
    k+=time[i+1]-time[i];
    count++;
        }
    }
    k =k / count;
    where:
    k represents the slope of the curve
```

Employing a matching slope algorithm 58 shown in Table 4, the reading time fields 56 of the reading time array 44 are parsed to identify slopes matching the determined common slope 46 to ascertain individual ways.

TABLE 4

```
for(i=0;1<SEEK_SECTOR-2;1++)
{
    double pp=(time[i+2]-time[i])/2;
    if(fabs(1-pp/k)>0.2)continue;
    for(j=i+3;j<SEEK_SECTOR;j++)
    {
    if(time[j]<time[j+1])break;
    double pz=(time[j]-time[i])/(j-1);
    if(fabs(1-pz/k)>0.2)break;
    pp=pz;
    }
    //forming the line equation
    line.k=pp;
    line.b=-pp*i+time[i];
    i=j;
    //adding a line to the base of lines
    Add(line);
}
where:
i represents raw data
j is for tracking the sequence of the data
```

The data stored in the reading time array 44 is then utilized for measuring the quantity of sectors in each way employing a sector quantity algorithm 60 shown in Table 5.

TABLE 5

```
startsector = START_SECTOR//0x40000
    for(int i=0;i<1000;i++)
    {
    ReadSector(startsector,1,buffer,tmp);
    ReadSector(startsector-i-1,1,buffer,time[i]);
    }
    where:
    i represents raw data
```

Figure 7:
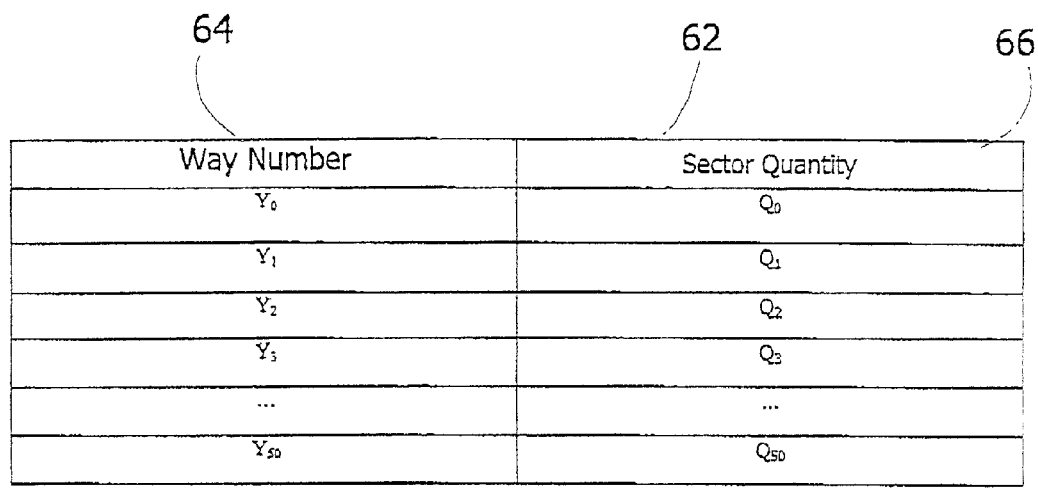
FIG. 7 shows a sector quantity array.

As shown in FIG. 7, measured sector quantity data is stored in a sector quantity array 62, which includes a way number column 64 and a sector quantity column 66, The sector quantity array 62 is used for establishing a pattern or "fingerprint" for the disc. To determine a target disc's authenticity, its fingerprint Is compared to a fingerprint of an original disc provided in the form of a CD-Key.

To allow for differences that occur in duplicates due to wear and tear on stampers during the printing process, the optimal permissible percentage differentiation between disc fingerprints was established during experimentation to be less than or equal to about 30 percent. This "threshold value" provides a compromise between allowing for stamper wear and tear and detecting as many illegally copied discs as possible.

Therefore, taking into consideration the threshold value of 30 percent, the target disc should be considered to be an original disc if the percentage of coincidence is established to be greater than or equal to about 70 percent. Conversely, the target disc should be considered to be a counterfeit copy if the percentage of coincidence is established to be less than about 70 percent.

The invention uses a standard CD-ROM drive to exploit the deviations that occur due to differences between drives when discs are illegally copied.

In addition to regular CDs, the invention can be implemented for CD-Recordable (CD-R) discs since CD-Rs are pre-marked with empty sectors to enable proper synchronization of data during the final recording stage.

CD-R discs are made in batches produced from the same master, therefore having the same geometric structure. The mastering process determines the structure of a CD-R in the same manner as regular CDs, pre-determining the physical length of sectors even though product data has not yet been recorded so that even if data is burned onto separate CD-R discs using different equipment, as long as the discs are from the same batch, the differences that would typically exist either would not be detected using a standard drive or would not reach the 30% threshold.

In an embodiment of the present invention, to protect a non-recordable optical disc using the authentication method, a CD publisher provides core data locally and connects remotely to a "protection" website to run a remote copy of a protection program on the publisher's computer. The "core" data is encrypted and a protective "shell" added surrounding the core data. CD's are then made and a fingerprint is provided in the form of a CD-Key that is called by the shell during authentication.

In an embodiment of the present invention, to protect a recordable optical disc using the authentication method, a CD publisher provides core data locally and connects remotely to the protection website to run a remote copy of the protection program an the publisher's computer. A fingerprint is determined for the disc and provided to the publisher in the form of a CD-Key. The publisher then stores the disc and the provided CD-Key with other CD-Rs from the same batch for later use. When the publisher requires copies, they re-connect to the protection website to have the data encrypted and a protective shell added to the core data.

In an embodiment of the present invention, the core data is encrypted and the shell added in the same session as performing the fingerprinting. The publisher can then burn customer-ordered copies onto recordable discs from the same batch when needed, providing the CD-Key with the disc delivered to the customer.

Prior art disc protection methods entail slow and laborious steps employing expensive, high-precision equipment. The invention can provide a disc fingerprint using common, everyday equipment such as a CD-ROM drive-equipped personal computer.

As well, because the difference between disc formats lies in the data within the sectors and not in the way sectors are written to the disc, the invention provides a format-insensitive method of optical disc authentication.

In an embodiment of the present invention, the pre-defined location of ways is the outside edge of the trace to increase accuracy since differences are larger in this location due to error accumulation.

Although the present Invention has been described in considerable detail with reference to certain preferred embodiments thereof, other versions are possible. Therefore, the spirit and scope of the appended claims should not be limited to the description of the preferred embodiments contained herein.

What is claimed is:

1. An optical disc authentication method for authenticating optical discs, each disc having a plurality of ways and a plurality of sectors in each way, the method comprising the steps of:
   (i) measuring the quantity of sectors in each of a defined quantity of ways to provide a disc fingerprint comprising way sector quantity values for an original disc and a target disc; and
   (ii) authenticating the target disc by:
      a) comparing the target disc fingerprint to the original disc fingerprint to determine a percentage of coinciding way sector quantity values; and
      b) classifying the target disc according to whether its determined percentage value is above or below a pre-defined percentage threshold value, wherein a target disc having a determined percentage value of greater than or equal to the threshold value is classified as an original disc, and a target disc having a determined percentage value of less than the threshold value is classified as an illegally copied disc.

2. The method according to claim 1, wherein the pre-defined percentage threshold value is about 70.

3. The method according to claim 1, wherein the defined quantity of ways tested is at least about 50.

4. The method according to claim 1, wherein product data is encrypted.

5. The method according to claim 1, wherein a protective shell is added to product data that requests a correct CD-Key to unlock the shell for access to the product data.

6. The method according to claim 1, wherein one or more steps are performed remotely.

7. The method according to claim 1, wherein the original disc fingerprint is provided in the form of a CD-Key.

8. The method according to claim 1, wherein a recordable disc is used.

9. The method according to claim 8, wherein the recordable disc is blank to limit the process to disc fingerprinting, enabling adding of product data at a later time.

10. The method according to claim 1, the measuring step includes the steps of:
    (i) determining optical disc drive characteristics;
    (ii) collecting sector reading time data; and
    (iii) processing the collected data to provide way sector quantity values.

11. The method according to claim 10, wherein the optical disc drive characteristics are determined by:
    (i) determining cache buffer memory size of the disc drive; and
    (ii) determining reading speed reduction parameters of the disc drive.

12. The method according to claim 10, wherein the collected data is processed by:
    (i) filtering the data to compensate for reading errors;
    (ii) determining a common slope from the filtered data; and
    (iii) identifying slopes matching the determined common slope to ascertain individual ways for the measurement of way sector quantity values.

13. The method according to claim 10, wherein the sector reading time data is collected by:
    (i) filling the cache buffer with blank data; and
    (ii) collecting reading time data in a reading time array from a defined quantity and location of ways on a disc.

14. The method according to claim 13, wherein the defined location of ways is the outside edge of the trace to increase accuracy.

15. The method according to claim 14, wherein a file is added to product data, and the disc fingerprinting is performed at the outside edge of the disc to increase accuracy.

16. The method according to claim 15, wherein the file is empty.

17. An optical disc authentication apparatus for authenticating optical discs, each disc having a plurality of ways and a plurality of sectors in each way, the apparatus comprising:
    means for measuring the quantity of sectors in each of a defined quantity of ways to provide a disc fingerprint comprising way sector quantity values for an original disc and a target disc; and
    means for authenticating the target disc including:
        means for comparing the target disc fingerprint to the original disc fingerprint to determine a percentage of coinciding way sector quantity values; and
        means for classifying the target disc according to whether its determined percentage value is above or below a pre-defined percentage threshold value, wherein a target disc having a determined percentage value of greater than or equal to the threshold value is classified as an original disc, and a target disc having a determined percentage value of less than the threshold value is classified as an illegally copied disc.

18. The apparatus according to claim 17, wherein the pre-defined percentage threshold value is about 70.

19. The apparatus according to claim 17, wherein the determined quantity of ways tested is at least about 50.

20. The apparatus according to claim 17, wherein product data is encrypted.

21. The apparatus according to claim 17, wherein a protective shell is added to product data that requests a correct CD-Key to unlock the shell for access to the product data.

22. The apparatus according to claim 17, wherein one or more elements are performed remotely.

23. The apparatus according to claim 17, wherein the original disc fingerprint is provided in the form of a CD-Key.

24. The apparatus according to claim 17, wherein a recordable disc is used.

25. The apparatus according to claim 24, wherein the recordable disc is blank to limit the process to disc fingerprinting, enabling adding of product data at a later time.

26. The apparatus according to claim 17, wherein the measuring means includes:
  means for determining optical disc drive characteristics;
  means for collecting sector reading time data; and
  means for processing the collected data to provide way sector quantity values.

27. The apparatus according to claim 26, wherein the optical disc drive characteristics are determined by:
  means for determining cache buffer memory size of the disc drive; and
  means for determining reading speed reduction parameters of the disc drive.

28. The apparatus according to claim 26, wherein the collected data is processed by:
  means for filtering the data to compensate for reading errors;
  means for determining a common slope from the filtered data; and
  means for identifying slopes matching the determined common slope to ascertain individual ways for the measurement of way sector quantity values.

29. The apparatus according to claim 26, wherein the sector reading time data is collected by:
  means for filling the cache buffer with blank data; and
  means for collecting reading time data in a reading time array from a defined quantity and location of ways on a disc.

30. The apparatus according to claim 29, wherein the defined location of ways is the outside edge of the trace to increase accuracy.

31. The apparatus according to claim 30, wherein a file is added to product data, and the disc fingerprinting is performed at the outside edge of the disc to increase accuracy.

32. The apparatus according to claim 31, wherein the file is empty.

33. A storage medium readable by a computer, the storage medium having a computer program embodied thereon for authenticating optical discs, each disc having a plurality of ways and a plurality of sectors in each way, the storage medium comprising:
  code for measuring the quantity of sectors in each of a defined quantity of ways to provide a disc fingerprint comprising way sector quantity values for an original disc and a target disc; and
  code for authenticating the target disc including:
    code for comparing the target disc fingerprint to the original disc fingerprint to determine a percentage of coinciding way sector quantity values; and
    code for classifying the target disc according to whether its determined percentage value is above or below a pre-defined percentage threshold value, wherein a target disc having a determined percentage value of greater than or equal to the threshold value is classified as an original disc, and a target disc having a determined percentage value of less than the threshold value is classified as an illegally copied disc.

34. The storage medium according to claim 33, wherein the pre-defined percentage threshold value is about 70.

35. The storage medium according to claim 33, wherein the determined quantity of ways tested is at least about 50.

36. The storage medium according to claim 33, wherein product data is encrypted.

37. The storage medium according to claim 33, wherein a protective shell is added to product data that requests a correct CD-Key to unlock the shell for access to the product data.

38. The storage medium according to claim 33, wherein one or more steps are performed remotely.

39. The storage medium according to claim 33, wherein the original disc fingerprint is provided in the form of a CD-Key.

40. The storage medium according to claim 33, wherein a recordable disc is used.

41. The storage medium according to claim 40, wherein the recordable disc is blank to limit the process to disc fingerprinting, enabling adding of product data at a later time.

42. The storage medium according to claim 33, wherein the code for measuring the quantity of sectors includes:
  code for determining optical disc drive characteristics;
  code for collecting sector reading time data; and
  code for processing the collected data to provide way sector quantity values.

43. The storage medium according to claim 42, wherein the code for determining optical disc drive characteristics includes:
  code for determining cache buffer memory size of the disc drive; and
  code for determining reading speed reduction parameters of the disc drive.

44. The storage medium according to claim 42, wherein the code for processing the collected data includes:
  code for filtering the data to compensate for reading errors;
  code for determining a common slope from the filtered data; and
  code for identifying slopes matching the determined common slope to ascertain individual ways for the measurement of way sector quantity values.

45. The storage medium according to claim 42, wherein the code for collecting sector reading time data includes:
  code for filling the cache buffer with blank data; and
  code for collecting reading time data in a reading time array from a defined quantity and location of ways on a disc.

46. The storage medium according to claim 45, wherein the defined location of ways is the outside edge of the trace to increase accuracy.

47. The storage medium according to claim 46, wherein a file is added to product data, and the disc fingerprinting is performed at the outside edge of the disc to increase accuracy.

48. The storage medium according to claim 47, wherein the file is empty.

* * * * *